US012622828B2

(12) United States Patent
Christensen

(10) Patent No.: US 12,622,828 B2
(45) Date of Patent: May 12, 2026

(54) MECHANISM FOR LIFTING SEAT

(71) Applicant: GLOBAL FABTECH (SHANGHAI) COMPANY LIMITED, Shanghai (CN)

(72) Inventor: Hans Balle Christensen, Herning (DK)

(73) Assignee: GLOBAL FABTECH (SHANGHAI) COMPANY LIMITED, Jiuting (CN)

( * ) Notice: Subject to any disclaimer, the term of this patent is extended or adjusted under 35 U.S.C. 154(b) by 138 days.

(21) Appl. No.: 18/721,093

(22) PCT Filed: Jan. 6, 2023

(86) PCT No.: PCT/CN2023/071073
§ 371 (c)(1),
(2) Date: Jun. 17, 2024

(87) PCT Pub. No.: WO2023/131309
PCT Pub. Date: Jul. 13, 2023

(65) Prior Publication Data
US 2025/0057710 A1 Feb. 20, 2025

(30) Foreign Application Priority Data
Jan. 7, 2022 (DK) ............................. PA202200013

(51) Int. Cl.
*A61G 5/10* (2006.01)

(52) U.S. Cl.
CPC .................................. *A61G 5/1075* (2013.01)

(58) Field of Classification Search
CPC .................................................... A61G 5/1075
(Continued)

(56) References Cited

U.S. PATENT DOCUMENTS 4,946,222 A * 8/1990 Matson .................... A61G 5/14 297/DIG. 10
5,641,201 A * 6/1997 Casey ...................... A61G 5/14 297/440.22
(Continued)

FOREIGN PATENT DOCUMENTS

CN 101258968 A 9/2008
CN 101396322 A 4/2009
(Continued)

OTHER PUBLICATIONS

International Search Report and Written Opinion of the International Searching dated May 22, 2023 (11 pages) from PCT Priority Application PCT/CN2023/071073.
(Continued)

*Primary Examiner* — Anthony D Barfield
(74) *Attorney, Agent, or Firm* — Crowell & Moring LLP

(57) ABSTRACT

A mechanism for tilting a seat or support from horizontal to inclined or even vertical. The mechanism tilts a top frame relative to a lower frame including an actuator. The top frame is attached to the lower frame by first and second rigid connections rotatably mounted relative to both the top frame and the lower frame, the first rigid connection is rotatably mounted to the top frame at a first axis and to the lower frame at a second axis. The second rigid connection is rotatably mounted to the top frame at a third axis and to the lower frame at a fourth axis. The actuator is mounted rotatably to the top frame at a fifth axis and also the actuator is mounted rotatably to an arm at a sixth axis, the arm extends from the first axis and the arm rotates together with the first axis.

9 Claims, 4 Drawing Sheets

(58) Field of Classification Search
USPC .................................................... 297/DIG. 10
See application file for complete search history.

(56) References Cited

U.S. PATENT DOCUMENTS

| | | | | |
|---|---|---|---|---|
| 5,984,338 | A * | 11/1999 | Meyer | A61G 5/1054 297/316 |
| 6,000,758 | A | 12/1999 | Schaffner et al. | |
| 6,213,554 | B1 * | 4/2001 | Marcoux | A61G 5/14 297/DIG. 10 |
| 6,659,556 | B2 | 12/2003 | Pellerin | |
| 7,396,074 | B2 | 7/2008 | Wiecek | |
| 7,543,885 | B2 | 6/2009 | Pollard et al. | |
| 7,850,232 | B2 | 12/2010 | Casteel | |
| 8,308,228 | B2 | 11/2012 | Lawson et al. | |
| 8,403,409 | B2 | 3/2013 | Pollard et al. | |
| 9,016,788 | B1 | 4/2015 | Pollard et al. | |
| 9,039,078 | B2 | 5/2015 | Lawson et al. | |
| 9,050,231 | B2 | 6/2015 | Masters | |
| 9,848,704 | B1 | 12/2017 | Pollard et al. | |
| 10,568,790 | B2 | 2/2020 | Jahkel et al. | |
| 11,344,459 | B2 | 5/2022 | Jähkel et al. | |
| 2003/0047973 | A1 | 3/2003 | Pellerin | |
| 2006/0061148 | A1 | 3/2006 | Pollard et al. | |
| 2008/0001442 | A1 | 1/2008 | Wiecek | |
| 2008/0150329 | A1 | 6/2008 | Lawson | |
| 2008/0217975 | A1 | 9/2008 | Casteel | |
| 2009/0278395 | A1 | 11/2009 | Pollard et al. | |
| 2011/0193373 | A1 | 8/2011 | Lawson et al. | |
| 2013/0038095 | A1 | 2/2013 | Lawson et al. | |
| 2014/0021760 | A1 | 1/2014 | Masters | |
| 2014/0262566 | A1 | 9/2014 | Davis et al. | |
| 2018/0280215 | A1 | 10/2018 | Jahkel et al. | |
| 2020/0093666 | A1 | 3/2020 | Jähkel et al. | |

FOREIGN PATENT DOCUMENTS

| | | | |
|---|---|---|---|
| CN | 101484045 | A | 7/2009 |
| CN | 102160717 | A | 8/2011 |
| CN | 104427910 | A | 3/2015 |
| CN | 108743087 | A | 11/2018 |
| CN | 110520091 | A | 11/2019 |
| CN | 111067726 | A | 4/2020 |
| GB | 926157 | A | 5/1963 |
| GB | 2585939 | A | 1/2021 |
| GB | 2591807 | A | 8/2021 |
| WO | WO 2019/045184 | A1 | 3/2019 |

OTHER PUBLICATIONS

International Preliminary Report and Patentability (Date of Issuance: Jun. 20, 2024) (1 pages); and Appended Written Opinion of the International Searching Authority (Dated May 22, 2023) (4 pages).

Office Action issued in corresponding Danish Patent Application No. PA 2022 00013 dated Jul. 15, 2022 (7 pages).

Invacare Video, Rea Dahlia 45 manual wheelchair publicly available at (https://www.youtube.com/watch?v=kYmyw_cjeNc), as of Dec. 16, 2026); Mentioned at p. 1 of published PCT Priority Application PCT/CN2023/071073.

* cited by examiner

MECHANISM FOR LIFTING SEAT

This application is a national application based on Patent Cooperation Treaty Patent Application No. PCT/CN2023/071073, filed on Jan. 6, 2023, the entire contents of which are incorporated herein by reference.

This application claims under 35 U.S.C. § 119(a) the benefit of the filing date of Danish Patent Application No. PA 202200013, filed on Jan. 7, 2022, the entire contents of which are incorporated herein by reference.

BACKGROUND OF THE INVENTION

Technical Field

The invention relates to a mechanism for tilting a seat or support from horizontal to inclined or even vertical. The mechanism is suitable for use in e.g. a wheelchair.

The invention relates to a mechanism used to prevent pressure ulcers on the buttocks. Pressure ulcers affect nearly all wheelchair users and are a major cost factor in the healthcare system. Pressure ulcers are difficult to prevent and challenging to treat. Classical treatment involves extended periods of bedrest, which is believed to cause further deterioration of the patient's general condition and may lead to formation of ulcers in new places and even to sepsis or other potentially lethal complications.

DESCRIPTION OF RELATED ART

On way of reducing the risk of pressure ulcers to wheelchair users is to tilt the seat of the wheelchair. When a user is sitting on a chair or in a wheelchair, the part of the body experiencing the largest pressure is tuber ischiadicum, also known as sit bones. When the seat is tilted together with the back support, the pressure area moves along the back of the user thereby providing a larger weight-bearing surface consequently reducing pressure on the tuber ischii.

This concept is e.g. known from the Rea Dahlia 45 wheelchair from Invacare shown in the video: Rea Dahlia 45 (published 16 Dec. 2016). The tilting mechanism of this chair includes an actuator being attached to the base of the wheelchair and pushing upward.

There are other tilting mechanisms providing raising of a seat end. GB2591807 A relates to a furniture platform lifting mechanism. The furniture platform lifting mechanism 10 comprises a base 12, first and second connecting arms 14, 16 with complimentarily engaging guide 20 and follower, and an actuator 30 moving the mechanism 10 between a lowered and raised condition by moving the arms 14, 16 and an associated platform relative to the base while maintaining the guide 20 and follower connection. The arms 14, 16 are releasably engageable with the base 12 and the associated platform. When the actuator 30 is activated, it causes the follower to lift and rotate the associated platform relative to the base 12. An end of the second arm 16 may move freely against the base 12 or associated platform. The mechanism 10 may be used as part of an adjustable chair or with a desktop. The actuator 30 is attached to the lower frame, and the document does not teach how to adapt the angle of inclination of the seat.

SUMMARY OF THE INVENTION

The present invention relates to a mechanism for tilting a seat or support from lowered e.g. approximately horizontal position, to an inclined or raised position, i.e. the angle of a seat or support relative to horizontal in respectively a raised and a lowered position is changed.

The invention improves the possibilities for incorporating the mechanism in a chair or wheelchair as the mechanism is very compact and takes up relatively little space. In the lowered position the actuator is hidden between the frames of the mechanism.

The purpose of the present invention is to provide an inclination of a seat or support for wheelchairs in order for the user of the chair/wheelchair achieve a good redistribution of pressure towards the seat and e.g. avoid pressure ulcers. Optimally, the user should be able to place the seat or support in an angle of at least 45 degrees to obtain adequate relieve.

According to a first aspect, the invention relates to a mechanism for tilting a top frame (A) relative to a lower frame (B) including an actuator (H), the top frame (A) is attached to the lower frame (B) by at least two rigid connections (C, D), the first and second rigid connections (C, D) are rotatably mounted relative to both the top frame (A) and the lower frame (B), the first rigid connection (C) is rotatably mounted to the top frame (A) at a first axis (3) and to the lower frame (B) at a second axis (1), the second rigid connection (D) is rotatably mounted to the top frame (A) at a third axis (4) and to the lower frame (B) at a fourth axis (2), the first axis (3) and the third axis (4) are stationary relative to the top frame (A) and the second axis (1) and the fourth axis (2) are stationary relative to the lower frame (B), in a longitudinal direction the top frame (A) includes a first half part having a first end (9) and a second half part having a second end (10) and upon activation of the actuator (H) the first end (9) is raised above the level of the second end (10), wherein the actuator (H) is mounted rotatably to the top frame (A) at a fifth axis (7) and also the actuator (H) is mounted rotatably to an arm (E) at a sixth axis (8), the arm (E) extends from the first axis (3) and the arm (E) rotates together with the first axis (3). "The lower frame B" may be part of or be constituted of a base of a chair or a wheelchair, i.e. the lower frame B need not be a separate frame as such.

According to an embodiment of the first aspect, the actuator (H) may be connected to the arm (E) extending radially from the first axis (3) by a fourth rigid connection (G), the fourth rigid connection (G) is rotatably mounted to the arm (E) at a sixth axis (8) and to the actuator (H) at an eight axis (6). By using this extra fourth rigid connection G, it is possible to make the mechanism and the top frame shorter and more compact.

According to an embodiment of the first aspect, the embodiment may include a third rigid connection (F) connected rotatably to the top frame (A) at a seventh axis (5) and connected rotatably to the actuator (H) at an eight axis (6). The extra third rigid connection F makes it possible to reduce the length of the mechanism further and also makes it possible to adapt the length of the rigid connections E and F to adapt the inclination of the top frame A.

According to an embodiment of the first aspect, the fifth axis (7) may be positioned in the first half part of the top frame (A) close to the first end (9). That the fifth axis 7 is positioned close to the first end 9 means that the fifth axis 7 is positioned closer to the first end 9 than to the middle of the top frame A, where "the middle" is where the first half part and the second half part meets.

According to an embodiment of the first aspect, the first axis (3) and the third axis (4) may be position at the second half part of the top frame (A), and the third axis (4) may be positioned closer to the second end (10) than the first axis (3). The exact position of and distance between the first axis 3 and the third axis 4 is used to adapt the inclination of the top frame A relative to the lower frame B.

According to an embodiment of the first aspect, an angle α between a top surface of the top frame A and a top surface of the lower frame B may vary between 0 and 90 degrees, e.g. between 0 and 70 degrees.

According to a second aspect, the invention relates to chair or a wheelchair including a mechanism according to the first aspect.

According to an embodiment of the second aspect, the chair or wheelchair may further include a back support (K) which may be connected to the top frame (A) or to another part of the chair/wheelchair. The back support (K) may move dependently or independently of the top frame A, according to one embodiment the back support K moves together with the top frame A, according to one embodiment the back support K is connected to an actuator L which adjust the inclination of the back support K either automatically and dependent on the inclination of the top frame A or manually and independent of the inclination of the top frame A.

According to an embodiment of the second aspect, the first end (9) may be the front end of a seat of the chair/wheelchair and the second end (10) may be the rear end of the seat of the chair/wheelchair. A seat cushion or support may rest on the top frame (A) supporting the person seated in the chair/wheelchair.

According to an embodiment of the second aspect, the top frame (A) may be inclined at least 45 degrees relative to horizontal and the back support (K) may be inclined at least 85 degrees at a standard sitting position and at least 110 degrees relative to the top frame (A) in a relaxed position, i.e. the angle β between the top frame (A) and the back support (K) may be at least 85 degrees and at maximum 160 degrees.

Pressure measurements indicates that a 45 degrees seat tilt is desirable for redistributing the pressure of a user against the seat. At 45 degrees seat tilt and 5 degrees back tilt, there is found to be a 20% less pressure on tubes compared to a starting point of 5 degrees seat tilt and 5 degrees back tilt. If the user is positioned with 45 degrees seat tilt and 30 degrees back tilt, there are approx. 35% less pressure on tubes compared to a starting position with 5 degrees seat tilt and 5 degrees back tilt.

BRIEF DESCRIPTION OF THE DRAWINGS

FIG. 1A shows the embodiment in a side view and FIG. 1B shows the embodiment in the same position in an inclined view.

FIG. 2A shows the embodiment in a side view and FIG. 2B shows the embodiment in the same position in a view from below.

DETAILED DESCRIPTION OF THE INVENTION

Definitions

Prior to discussing the present invention in further details, the following terms and conventions will first be defined:

In general—These words indicates that a feature defined may be used with all embodiments encompassed by the claims even though the definition of the feature may be placed in the part of the specification defining the detailed description.

It should be noted that embodiments and features described in the context of one of the aspects of the present invention also apply to the other aspects of the invention.

Figure 1:
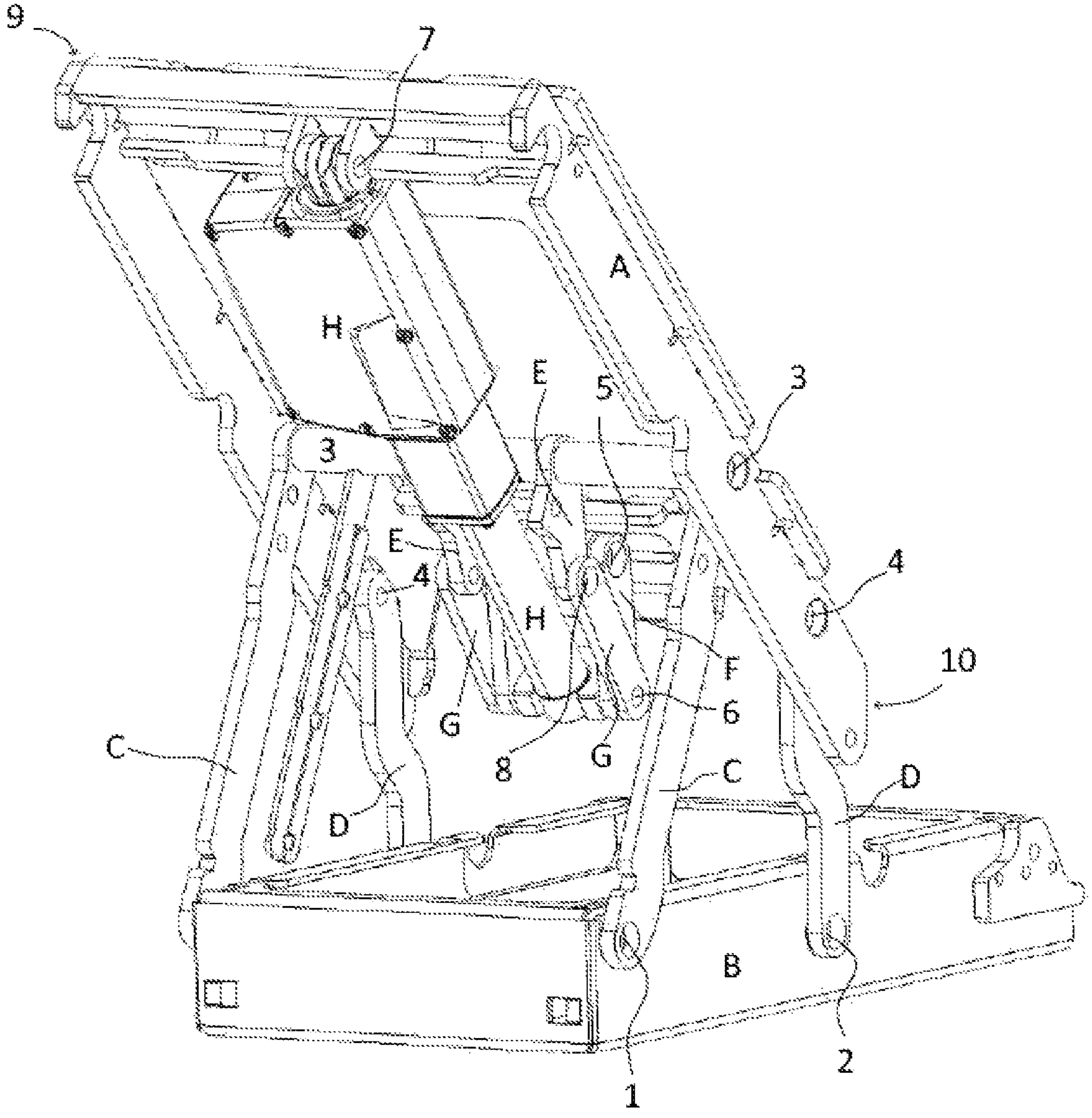
FIGS. 1A and 1B show an embodiment of a mechanism according to the invention in a raised or inclined position.
Figure 2:
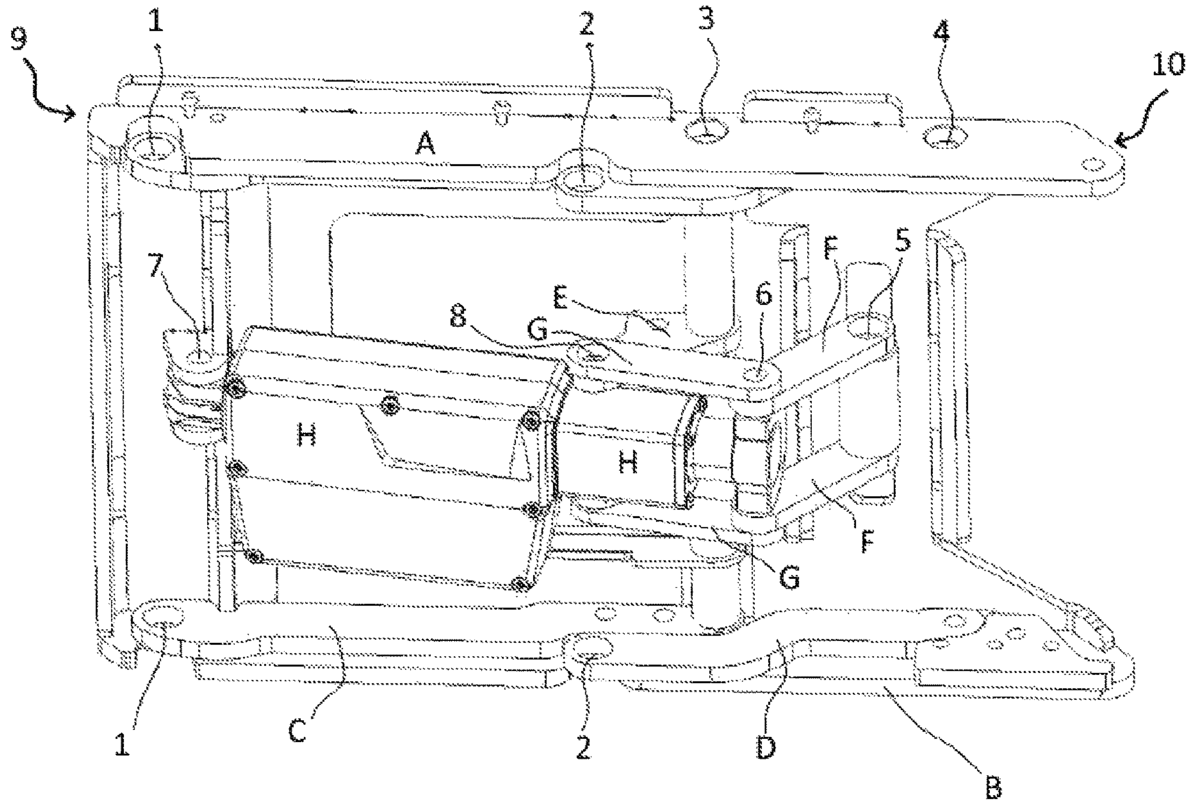
FIG. 2 shows the same embodiment of a mechanism according to the invention as FIG. 1 in a lowered position.

FIGS. 1 and 2 show an embodiment of a mechanism according to the invention, in FIG. 1 the mechanism is in an inclined state and in FIG. 2 the mechanism is in a non-inclined state. A mechanism according to the invention includes a top frame A and a lower frame B and during use, the top frame A may be tilted or inclined relative to a lower frame B.

In general, a mechanism according to the invention has at least one inclined or open state and at least one non-inclined state or lowered state. In the non-inclined or lowered state, the top frame A and the lower frame B are positioned as close to each other as possible for the specific mechanism and approximately in the same direction.

In the embodiment of FIGS. 1 and 2, the top surface of respectively the top frame A and the lower frame B are in the non-inclined or closed position placed in the same direction i.e. they are parallel and the top frame A are positioned above the lower frame when the mechanism is placed in a chair or a wheelchair in an operational position.

The mechanism further includes an actuator H and the top frame A is attached to the lower frame B by at least two rigid connections C and D. The first and second rigid connections C and D are rotatably mounted relative to both the top frame A and the lower frame B, the first rigid connection C is rotatably mounted to the top frame A at a first axis 3 and to the lower frame B at a second axis 1, the second rigid connection D is rotatably mounted to the top frame A at a third axis 4 and to the lower frame B at a fourth axis 2. The first axis 3 and the third axis 4 are stationary relative to the top frame A and the second axis 1 and the fourth axis 2 are stationary relative to the lower frame (B) where "stationary" means that the position of the axis do not change. In a longitudinal direction, the top frame A includes a first half part having a first end 9 and a second half part having a second end 1) and upon activation of the actuator H the first end 9 is raised above the level of the second end 10, the second end 10 may be raised as well by the first end 9 is at least raised more than the second end. The actuator H is mounted rotatably to the top frame A at a fifth axis 7 and also the actuator H is mounted rotatably to an arm E) at a sixth axis 8, the arm E extends from the first axis 3 and the arm E rotates together with the first axis 3, i.e. when the first axis rotates then the arm E rotates with the same radian velocity (or angular frequency or radian frequency).

The arm E may extend radially from the first axis 3 and the actuator H may be connected to the arm E via a fourth rigid connection G which fourth rigid connection G is rotatably mounted to the arm E at a sixth axis 8 and to the actuator H at an eight axis 6. By using such an extra fourth rigid connection G, it is possible to make the mechanism and the top frame shorter and more compact.

The mechanism may also include a third rigid connection F connected rotatably to the top frame A at a seventh axis 5 and connected rotatably to the actuator H at an eight axis 6. The extra third rigid connection F makes it possible to reduce the length of the mechanism further and also makes it possible to adapt the length of the rigid connections E and F to adapt the inclination of the top frame A.

Normally, the fifth axis 7 is positioned in the first half part of the top frame A close to the first end 9. That the fifth axis 7 is positioned close to the first end 9 means that the fifth axis 7 is positioned closer to the first end 9 than to the middle of the top frame A, where "the middle" is where the first half part and the second half part meets.

Normally, the first axis 3 and the third axis 4 are position at the second half part of the top frame A, and the third axis 4 is positioned closer to the second end 10 than the first axis 3. The exact position of and distance between the first axis 3 and the third axis 4 is used to adapt the inclination of the top frame A relative to the lower frame B.

A mechanism according to the invention may be used in a chair or a wheelchair to tilt or to raise a seat. Normally, a seat i.e. a support in form of a cushion will be attached or fixed to the top frame A.

Figure 3A:
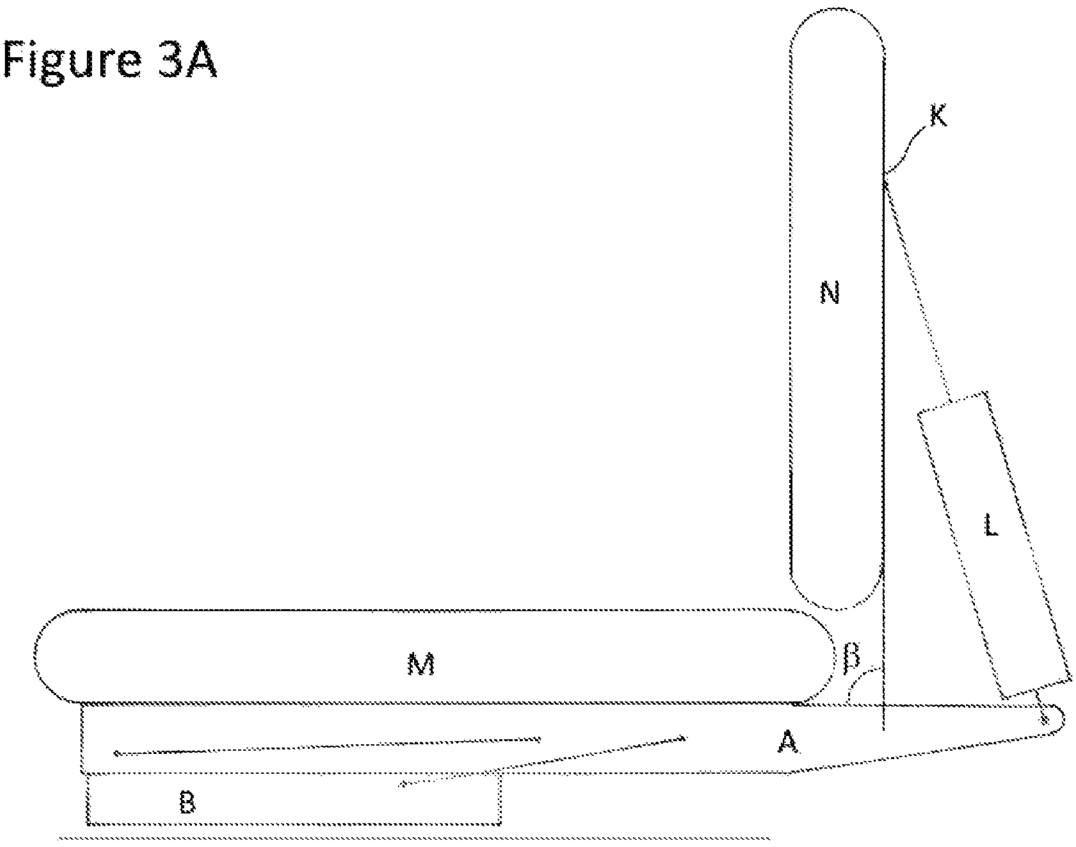
FIGS. 3A and 3B show use of a mechanism according to the invention in a wheelchair.
Figure 3B:
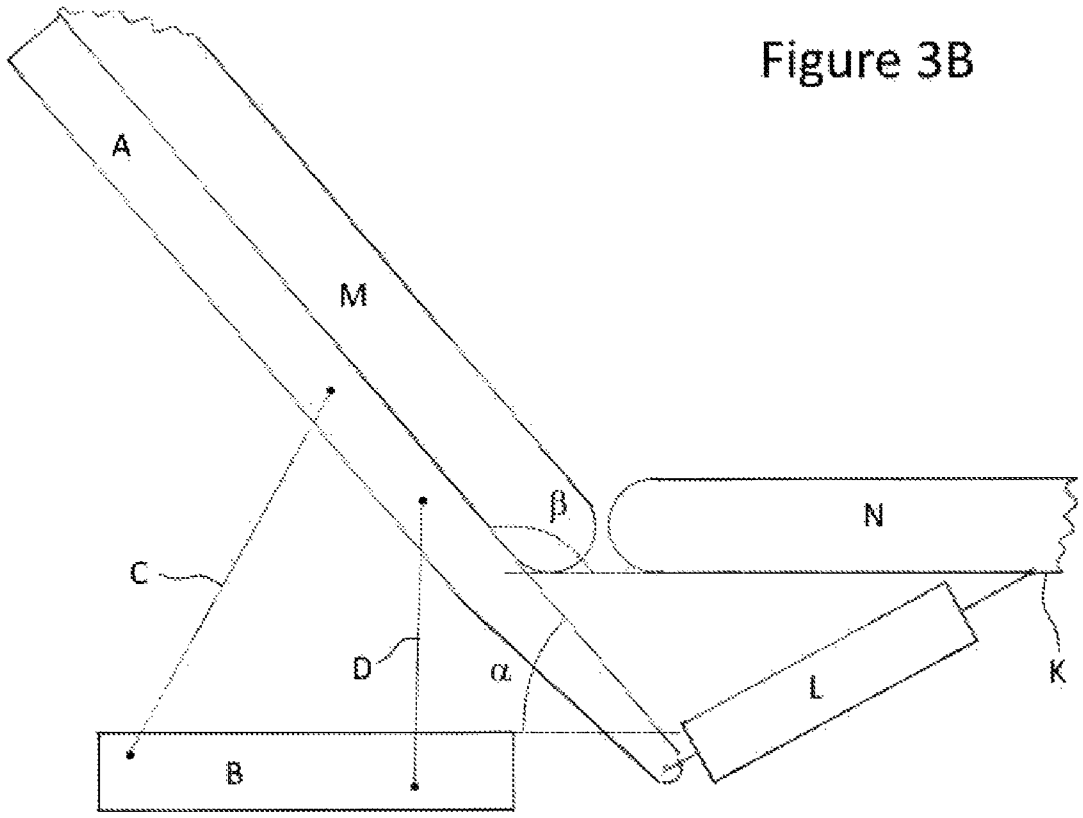

FIGS. 3A and 3B illustrates a mechanism according to the invention used for tilting the seat in a chair or wheelchair, the chair or wheelchair may further include a back support K as illustrated in FIGS. 3A and 3B.

FIG. 3A illustrates the position of a seat of a chair or a wheelchair in a standard sitting position where the tilting mechanism is in a lowered or non-inclined state. In the standard sitting position the angle β between a back support K and the top frame A is normally between 85-95 degrees. The angle α between the top surface of the top frame A and the top surface of the lower frame is approximately 0 degrees as the two surfaces are parallel.

FIG. 3B illustrates the position of a seat of a chair or wheelchair in a relaxed or pressure reduced position where the tilting mechanism is in an inclined or raised state. In the relaxed or pressure reduced state the angle α between the top surface of the top frame A and the top surface of the lower frame has been increased to between 45 and 55 degrees while the angle β between the back support K and the top frame A has also been increased to around 110-140 degrees.

The first end 9 of the top frame A may correspond to the front end of a seat of the chair/wheelchair and the second end 10 may correspond to the rear end of the seat of the chair/wheelchair. The "front" of a seat is where the user's leg is positioned.

In general, a seat cushion M or another comfortable support may rest on the top frame A supporting the person seated in the chair/wheelchair, and a back cushion N or another comfortable support may be attached to the back support K. Due to the construction of the tilting mechanism, the top frame A is moved forward when the top frame A is tilted, the center of gravity of the user is therefore also moved forward preventing the balance of the chair/wheelchair being challenged.

The back support K may be connected to the top frame (A) or to another part of the chair/wheelchair and the back support K may move dependently or independently of the top frame A.

According to an embodiment, the back support K may move together with the top frame A i.e. the position of the back support K depends on the position of the top frame A. According to an embodiment the back support K may be connected to an actuator L which adjust the inclination of the back support K either automatically and dependent on the inclination of the top frame A or manually and independent of the inclination of the top frame A. FIGS. 3A and 3B show an hydraulic actuator L for illustration purposes, but any kind of actuator may be used.

The first end 9 of the top frame A may be corresponding to the front end of a seat of the chair/wheelchair and the second end 10 may correspond to the rear end of the seat of the chair/wheelchair. The "front" of a seat is where the user's leg is positioned.

A seat cushion M or comfortable support may rest on the top frame A supporting the person seated in the chair/wheelchair, and also a back cushion N or comfortable support may be attached to the back support K.

Figure 4:
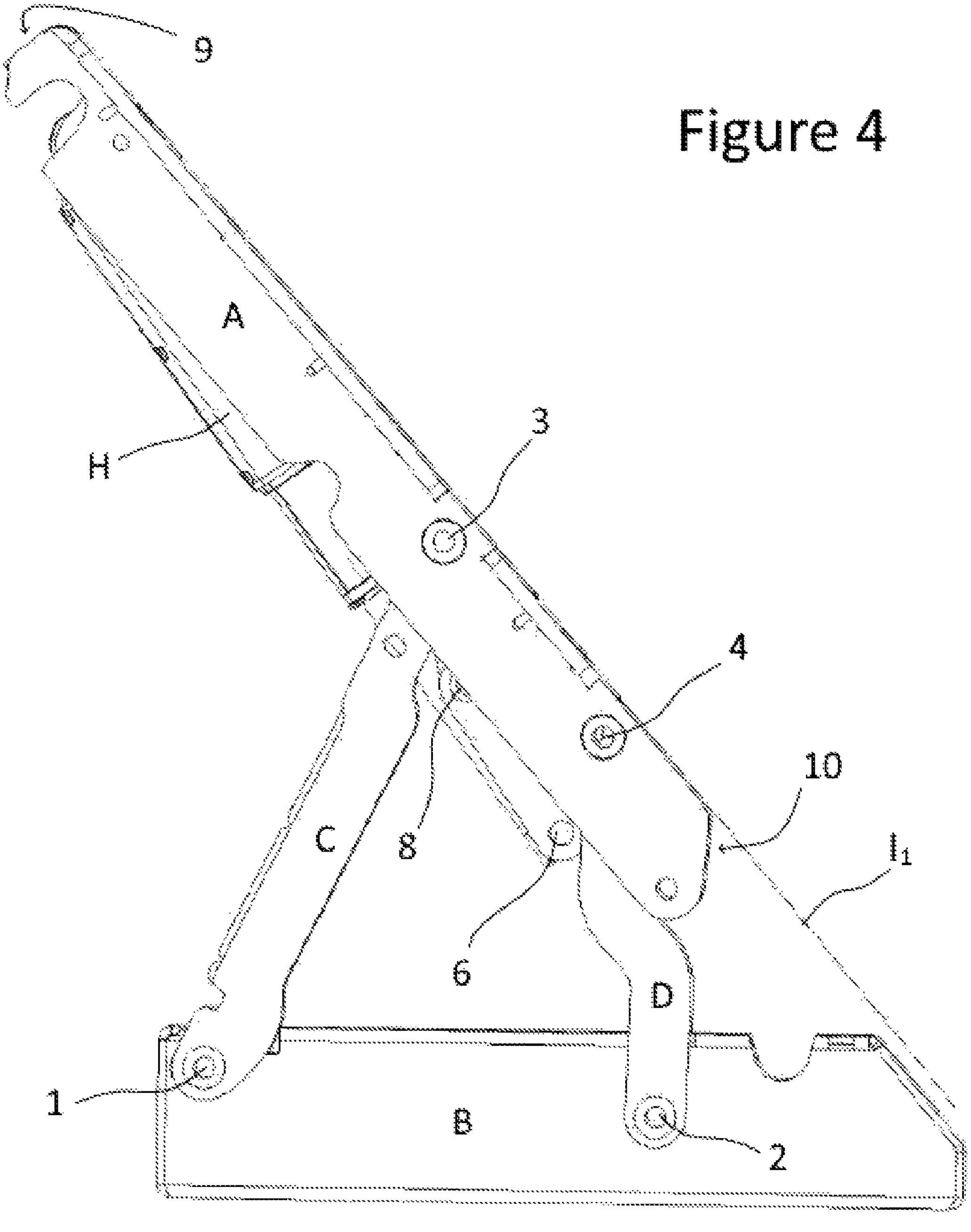
FIG. 4 shows a second embodiment of a mechanism according to the invention comprising an adapted lower frame B.

FIG. 4 shows a side view of a second embodiment of a mechanism according to the invention comprising an adapted or shortened lower frame B. Only the lower frame is changed compared to the first embodiment. The embodiment is shown in an inclined state and a dotted line $I_1$ illustrates how the top surface of the top frame A may extend into and/or below the level of the lower frame B. FIG. 4 illustrates how it is possible to adapt the length and shape of the lower profile B in order to increase the available space near and below the second end 10 of the top frame A and e.g. below a back support K.

According to the second embodiment, the lower frame B is shortened to such a degree that it is possible to pivot the top frame A and a material or support positioned on the top frame A, to such a degree that the top frame A or a material or support positioned on the top frame A extend beside or below the level of the lower frame B without loosing or jeopardizing the functionality of the tilting mechanism.

| Ref. no. | Reference name |
|---|---|
| A | Top frame |
| B | Lower frame |
| C | First rigid connection between top frame and lower frame |
| D | Second rigid connection between top frame and lower frame |
| E | Arm extending radially from first axis |
| F | Third rigid connection between top frame and actuator |
| G | Fourth rigid connection between radial arm of first axis and actuator |
| H | Actuator |
| K | Back support |
| L | Actuator for back support |
| M | Seat cushion or support |
| N | Back cushion or support |
| 1 | Second axis |
| 2 | Fourth axis |
| 3 | First axis |
| 4 | Third axis |
| 5 | Seventh axis |
| 6 | Eight axis |
| 7 | Fifth axis |
| 8 | Sixth axis |
| 9 | First end |
| 10 | Second end |

The invention claimed is:

1. A mechanism for tilting a top frame relative to a lower frame comprising:

an actuator;

a top frame is attached to a lower frame by a first rigid connection and a second rigid connection rotatably mounted relative to both the top frame and the lower frame, wherein the first rigid connection is rotatably mounted to the top frame at a first axis and to the lower frame at a second axis, and the second rigid connection is rotatably mounted to the top frame at a third axis and to the lower frame at a fourth axis;

wherein the first axis and the third axis are stationary relative to the top frame and the second axis and the fourth axis are stationary relative to the lower frame;

wherein in a longitudinal direction, the top frame comprises a first half part comprising a first end, and a second half part comprising a second end and upon activation of the actuator, the first end is raised above a level of the second end;

wherein the actuator is mounted rotatably to the top frame at a fifth axis and also the actuator is mounted rotatably to an arm at a sixth axis, the arm extends from the first axis and the arm rotates together with the first axis.

2. The mechanism according to claim 1, wherein the actuator is connected to the arm extending radially from the first axis by a third rigid connection, the third rigid connection is rotatably mounted to the arm at the sixth axis and to the actuator at a seventh axis.

3. The mechanism according to claim 1, further comprising a third rigid connection connected rotatably to the top frame at a seventh axis and connected rotatably to the actuator at an eighth axis.

4. The mechanism according to claim 1, wherein the fifth axis is positioned in the first half part of the top frame close to the first end.

5. The mechanism according to claim 1, wherein the first axis and the third axis are positioned at the second half part of the top frame, and the third axis is positioned closer to the second end than the first axis.

6. The mechanism according to claim 1, wherein an angle $\alpha$ between a top surface of the top frame and a top surface of the lower frame varies between 0 and 90 degrees.

7. A chair or a wheelchair comprising:

a mechanism for tilting a top frame relative to a lower frame comprising:

an actuator;

a top frame attached to a lower frame by a first rigid connection and a second rigid connection rotatably mounted relative to both the top frame and the lower frame, wherein the first rigid connection is rotatably mounted to the top frame at a first axis and to the lower frame at a second axis, and the second rigid connection is rotatably mounted to the top frame at a third axis and to the lower frame at a fourth axis;

wherein the first axis and the third axis are stationary relative to the top frame and the second axis and the fourth axis are stationary relative to the lower frame;

wherein in a longitudinal direction, the top frame comprises a first half part comprising a first end, and a second half part comprising a second end and upon activation of the actuator, the first end is raised above a level of the second end;

wherein the actuator is mounted rotatably to the top frame at a fifth axis and also the actuator is mounted rotatably to an arm at a sixth axis, the arm extends from the first axis and the arm rotates together with the first axis; and a back support which is connected to the top frame or to another part of the chair/wheelchair.

8. The chair or a wheelchair according to claim 7, wherein the first end is a front end of a seat of the chair/wheelchair and the second end is a rear end of the seat of the chair/wheelchair.

9. The chair or a wheelchair according to claim 7, wherein the top frame is inclined at least 45 degrees relative to horizontal and the back support is inclined at least 85 degrees to the top frame in a standard sitting position, and/or at least 110 degrees relative to the top frame in a relaxed position.

* * * * *